(12) United States Patent  
Bradai et al.

(10) Patent No.: US 8,103,422 B2
(45) Date of Patent: Jan. 24, 2012

(54) METHOD FOR THE ANTICIPATED ASCERTAINMENT OF A BEND ON A PORTION OF ROAD, AND ASSOCIATED SYSTEM

(75) Inventors: Benazouz Bradai, Bobigny (FR); Anne Herbin, Paris (FR); Michel Basset, Heimsbrunn (FR); Jean-Philippe Lauffenburger, Rixheim (FR)

(73) Assignee: Valeo Vision, Bobigny (FR)

( * ) Notice: Subject to any disclaimer, the term of this patent is extended or adjusted under 35 U.S.C. 154(b) by 401 days.

(21) Appl. No.: 11/860,681

(22) Filed: Sep. 25, 2007

(65) Prior Publication Data
US 2008/0249706 A1 Oct. 9, 2008

(30) Foreign Application Priority Data
Sep. 26, 2006 (FR) ...................................... 06 08439

(51) Int. Cl.
*B60T 7/12* (2006.01)
*B60R 22/00* (2006.01)
(52) U.S. Cl. .............................. 701/77; 701/49; 382/321
(58) Field of Classification Search .................... 701/58, 701/77, 36, 49, 200–226; 340/437, 458, 340/565, 468, 555, 556; 362/466, 465; 382/316, 382/321
See application file for complete search history.

(56) References Cited

U.S. PATENT DOCUMENTS

| 6,141,617 A | 10/2000 | Matsuda et al. |
| 7,280,901 B2 | 10/2007 | Dubrovin et al. |
| 7,707,192 B1 * | 4/2010 | Lu et al. .......................... 707/687 |
| 2001/0055390 A1 * | 12/2001 | Hayashi et al. ................ 380/220 |
| 2002/0188838 A1 * | 12/2002 | Welder ............................... 713/2 |
| 2003/0072471 A1 * | 4/2003 | Otsuka et al. .................. 382/103 |
| 2004/0085201 A1 | 5/2004 | Dubrovin et al. |
| 2004/0136568 A1 | 7/2004 | Milgram et al. |
| 2005/0040280 A1 * | 2/2005 | Hua ............................... 244/3.1 |
| 2005/0111752 A1 * | 5/2005 | Urard et al. .................... 382/276 |

(Continued)

FOREIGN PATENT DOCUMENTS

DE 19962549 C1 8/2001

(Continued)

OTHER PUBLICATIONS

Klotz, A. et al.: "Lane data fusion driver assistance systems," Seventh International Conference on Information Fusion Int. Soc. of Information Fusion, Mountain View, CA, USA, vol. 2, 2004, pp. 657-663, XP009082998, ISBN: 91-7056-116-8.

(Continued)

*Primary Examiner* — James Trammell
*Assistant Examiner* — Muhammad Shafi
(74) *Attorney, Agent, or Firm* — Jacox, Meckstroth & Jenkins

(57) ABSTRACT

A system and method for the anticipated detection of a bend on a portion of road taken by a motor vehicle comprising the following steps: establishing, by means of a first system, called as the navigation system, a first set of information on the bend in question, the first set of information being associated with a first confidence index; establishing, by means of a second system, called as the image processing system, a second set of information on the bend in question, the second set of information being associated with a second confidence index; and establishing, from the first set of information and the second set of information and by taking into account the first confidence index and the second confidence index, a third set of information on the bend in question.

14 Claims, 1 Drawing Sheet

U.S. PATENT DOCUMENTS

| | | | |
|---|---|---|---|
| 2005/0225477 A1* | 10/2005 | Cong et al. | 342/70 |
| 2005/0288580 A1* | 12/2005 | Lagrange et al. | 600/437 |
| 2006/0039158 A1* | 2/2006 | Kurz et al. | 362/539 |
| 2007/0052555 A1 | 3/2007 | Ibrahim | |

FOREIGN PATENT DOCUMENTS

| | | | |
|---|---|---|---|
| EP | 0780823 | A1 | 6/1997 |
| EP | 0887229 | A2 | 12/1998 |
| EP | 1415856 | A1 | 5/2004 |
| EP | 1431918 | A1 | 6/2004 |

OTHER PUBLICATIONS

Polychronopoulos, A. et al.: "Extended path prediction using camera and map data for lane keeping support," Sep. 13, 2005, Intelligent Transportation Systems, 2005. Proceedings. 2005 IEEE Vienna, Austria, Sep. 13-26, 2005, Piscataway, NJ, USA, pp. 602-607, XP010843091, ISBN: 0-7803-9215-9.

* cited by examiner

METHOD FOR THE ANTICIPATED ASCERTAINMENT OF A BEND ON A PORTION OF ROAD, AND ASSOCIATED SYSTEM

BACKGROUND OF THE INVENTION

1. Field of the Invention

The present invention relates to a method for the anticipated ascertainment of a bend on a portion of road taken by a motor vehicle and to a system for carrying out this method.

2. Description of the Related Art

The field of the invention is, generally speaking, that of motor vehicle headlamps. Known within this field are various types of headlamps, basically including:

parking lights, high-power lights and lights having a short range;

low-beam, or dipped, lights which are relatively powerful and have a road range of about 70 meters, which are used basically at night and the light beam of which is distributed so as not to dazzle the driver of an oncoming vehicle;

long-range, high-beam lights, and long-range-type complementary lights which have a range of vision on the road of about 200 meters and have to be switched off when passing another vehicle in order not to dazzle its driver;

advanced headlamps, known as bimodes, which combine the two functions of low-beam and full-beam lights by incorporating a removable screen;

fog lights, etc.

The conventional headlamp devices which have just been described, more specifically those which are used as low-beam lights, produce light beams which are capable of improvement when these headlamp devices are used under specific conditions. Thus, for example, when a vehicle approaches a bend, the headlamps continue to illuminate straight ahead of them, whereas it would be more beneficial to orient the light beam in the direction of the bend to be taken. This is why, in addition to the conventional main headlamp functions, notably dipped and full beam functions, various improvements have gradually appeared.

There have thus been developed sophisticated functions, known as AFS (advanced front lighting system) functions, including, notably, what is known as a DBL (dynamic bending light) function which produces an orientable headlamp device also known as a movable beam headlamp device: a headlamp device of this type is capable of modifying the orientation of a light beam produced by a light source in such a way that when the vehicle approaches a bend, the road is optimally illuminated by following the geometry of the road. (The term "headlamp device" refers to the headlamp itself or any other optical module movably mounted in a fixed headlamp.)

In order to implement such a function, a first known technology consists in allowing the main beam of the headlamp device to move by way of a motor which rotates as a function of an item of information originating from the vehicle, for example via a steering wheel angle sensor. The headlamp device is therefore said to be articulated. A second technology consists of a fixed light headlamp device comprising a plurality of light sources, for example of the light-emitting diode type, and means for controlling successive illumination of the sources as a function of the path of the vehicle so as to provide an effect in which light is swept toward the inside of an approaching bend.

With orientable headlamp devices of this type, the illumination of the road depends merely on the behavior of the driver. For example, if the driver turns the steering wheel of the vehicle toward the right, the headlamps of the vehicle are directed toward the right-hand side of the road in view of the fact that the bend extends to the right. Furthermore, the information relating to the change in direction is not sensed until the vehicle enters the curve of the bend, this information usually being provided by the steering wheel angle sensor detecting a variation in the angle of the steering wheel. The information is therefore supplied to the members monitoring the headlamp device only when the driver turns the steering wheel of the vehicle, when the vehicle has already entered the bend. As a result, the device is delayed on triggering of the lighting in the bend, thus resulting, for the driver, in a sense that the light beam has arrived late on entering the bend and in an excessively long return of the light beam in the axis of the vehicle on leaving the bend. This delay in the change of orientation of the headlamps not only is a source of discomfort for the driver but also compromises safety since there is, each time the orientation of the headlamps changes, a moment at which the road is insufficiently lit. The impossibility of detecting in advance a bend ahead therefore prevents optimum lighting of the bend in question.

In order to remedy these problems of non-anticipation, the prior art has proposed two types of solution.

A first type of solution consists in utilizing information derived from a navigation system.

A navigation system of this type combines information provided by a mapping system with indications given by the GPS of the vehicle. It allows the geometry of the road to be anticipated. For example, it is possible to be aware in advance of bends which will appear on the road in a given distance. It is therefore possible, by drawing on the information provided by the navigation system, to determine the distance separating the bend from the vehicle and also a radius of curvature of a bend which the vehicle is approaching and to orient at the appropriate moment, earlier than the foregoing solutions which have been described, light beams of the vehicle and thus to optimize the illumination of the bend. Devices of this type are described, notably, in patent applications EP 780 823, EP 887 229 and EP 1 415 856.

However, a certain number of defects inherent to the system limit the anticipation capacity thereof:

the current mapping is still very inaccurate. It frequently occurs that there is no information for a given place. Indeed, there are whole areas of the world which are not covered by the mapping databases;

the information provided by the navigation system may also be nonsensical. For example, if the driver planned to go to a place A which he has stored in his navigation system and if in the end, during his journey, he is led to go to a place B without following the indications given by the navigation system, then the items of information provided by this navigation system are inconsistent, or even contradictory, in relation to the path actually taken by the vehicle;

a loss of GPS coverage is also possible, for example when driving through a long tunnel or in an urban area with large buildings.

A second type of solution consists in the utilization of information obtained by an image processing system. A system of this type utilizes at least one camera and image processing software applications. An example of a system of this type consists in a method for detecting white lines located on roads. However, there are not always white lines on a road and these white lines, if they exist, may be faded or covered by deposits of one type or another, such as earth; in this case, they can no longer be detected by the detecting method. Another example of a system of this type, described in document EP 1 431 918, consists in a method for detecting the curbs of roads.

However, a method of this type is inadequate in various respects, especially if there is an intersection or junction on the road.

None of the existing systems is therefore entirely satisfactory for the anticipated detection of the characteristics of a bend which a motor vehicle is about to negotiate.

SUMMARY OF THE INVENTION

The main object of the invention is to propose a solution for determining characteristics of a subsequent bend which will be taken by a motor vehicle; the characteristics thus determined may then be utilized in various applications built into the vehicle in question. Use is made notably, but without thereby entailing any limitation, of the characteristics determined to optimize the illumination of the bend in question by the vehicle. This application is described more specifically, by way of example, in the present document. However, the characteristics determined by the method according to the invention may be utilized in other applications which will be specified hereinafter.

The subject-matter of the invention proposes a solution to the problems set out hereinbefore. Generally speaking, the invention proposes a combination of the two systems mentioned above, namely the navigation system and the system combining a camera and image processing applications, by proposing to merge these two sources of anticipatory information. The invention thus proposes, notably, the advantage of being able to provide a fail-safe mode of operation, which is useful in the event of failure of one of the two systems, based on the other system which has not failed. A fail-safe mode of this type, which is still an anticipatory mode of operation, is not available in the prior art. The invention therefore provides a set of information on a bend which a vehicle is about to negotiate, the information resulting from the fusion of the information provided by the two separate systems. Advantageously, confidence indices are allocated to each of the two systems, the confidence indices then occurring in the fusion of the information. The invention relates directly to various applications: improved utilization of the orientable headlamp devices, a warning issued to the driver before approaching a bend by indicating to him a recommended speed, optimization of an adaptive cruise control, etc.

The invention therefore basically relates to a method for the anticipated detection of a bend on a portion of road taken by a motor vehicle, comprising the various steps:

establishing, by means of a first system, called the navigation system, utilizing a receiver for data from a geographical positioning system and mapping data, a first set of information on the bend in question, the first set of information being associated with a first confidence index;

establishing, by means of a second system, called the image processing system, utilizing a camera and image processing applications, a second set of information on the bend in question, the second set of information being associated with a second confidence index;

establishing, from the first set of information and the second set of information and by taking into account the first confidence index and the second confidence index, a third set of information on the bend in question.

In addition to the main characteristics which have just been mentioned in the preceding paragraph, the method according to the invention may have one or more additional characteristics from among the following:

the first set of information is associated with a first confidence index and the second set of information is associated with a second confidence index, the step comprising establishing the third set of information on the bend in question being carried out by taking into account the first confidence index and the second confidence index;

the third set of information is associated with a third confidence index developed from the first confidence index and the second confidence index;

the first set of information and the second set of information comprise at least one item of data from among the following: radius of curvature of the bend in question, distance between a instantaneous position of the vehicle and the entering of the bend in question, type of bend (bend toward the left, toward the right, S-shaped bend);

the third set of information comprises at least one item of data from among the following: radius of curvature of the bend in question, distance between a instantaneous position of the vehicle and the entering of the bend in question, type of bend (bend toward the left, toward the right, S-shaped bend), relevant lighting point;

the first confidence index is developed from at least two parameters of a first set of the following parameters (it can also use one or more other parameters not appearing in this list):
  accuracy of the GPS positioning;
  accuracy of the digitization of the mapping;
  date on which the mapping was updated;
  type of road;
  level of information on the road;
  functional class of the road;
  environment of the vehicle;
  selection of a guide mode by the driver and level of conformity between a planned route and information provided by sensors on board of the vehicle;

the first confidence index is developed by taking a weighted average of values allocated to the following parameters, the parameters being associated with weighting coefficients resulting from a learning phase.

the second confidence index is developed from at least two parameters of a second set of the following parameters relating to an image obtained by the camera (it can also use one or more other parameters not appearing in this list):
  measurement of the texture of the image in question;
  shadow factor on the image in question;
  vertical gradient of the decrease in light;
  index of symmetry of the image in question;
  the second confidence index is developed by taking a weighted average of values allocated to all of the parameters of the second set of parameters, the parameters being associated with weighting coefficients resulting from a learning phase;

the method advantageously includes the following additional steps:
  comparing the first confidence index to a first threshold value and the second confidence index to a second threshold value, wherein the first threshold value and the second threshold value can be the same or different, depending on the applications;
  considering, when establishing the third set of information, only the set(s) of information, among the first set of information and the second set of information, of which the confidence index is greater than the threshold value to which it is compared;

the method includes the additional step consisting in adopting, in the event of the first confidence index and the second confidence index being less than the threshold values to which they are compared, a fail-safe mode of operation in which the bend in question is detected instantaneously;

the third set of information consists, notably, of data, the value of each of the items of data being established by taking a weighted average of corresponding data from the first set of information and the second set of information, an item of data of the first set being weighted by a first weighting coefficient and the corresponding data of the second set being weighted by a second weighting coefficient, the first weighting coefficient being greater than the second weighting coefficient if and only if the first confidence index is greater than the second confidence index.

Alternatively, this simple logical weighting method may be replaced by a data fusion system, for example using one of the following methods: Bayesian, fuzzy logic set theory, Dempster-Shafer theory of evidence.

the second system carries out, notably, the operation consisting in detecting curbs of the portion of road in question;—
the second system carries out, notably, the operation consisting in detecting white lines on the portion of road in question;

The present invention also relates to a system for the anticipated detection of a bend on a portion of road carrying out the method according to the invention with its main characteristics, and optionally one or more complementary characteristics, characterized in that it comprises:

a first system, called the navigation system, utilizing a receiver for data from a geographical positioning system, notably a GPS aerial, and mapping data to establish a first set of information on the bend in question, the first set of information being associated with a first confidence index;

a second system, called the image processing system, utilizing, notably, a camera and image processing applications to establish a second set of information on the bend in question, the second set of information being associated with a second confidence index;

means for processing information to establish, from the first set of information and the second set of information and by taking into account the first confidence index and the second confidence index, a third set of information on the bend in question.

In addition to the main characteristics which have just been mentioned in the preceding paragraph, the system according to the invention can have one or more complementary characteristics from among the following:

the first set of information, the second set of information and the third set of information comprise, notably, an item of data relating to the radius of curvature of the bend in question, the system being connected to a movable beam headlamp device;

the movable beam headlamp device is an orientable headlamp device;

the movable beam headlamp device is a fixed headlamp device comprising a plurality of light sources which are successively illuminated as a function of the path of the vehicle;

the first set of information, the second set of information and the third set of information comprise, notably, an item of data relating to the radius of curvature of the bend in question, the system being connected to an adaptive cruise control system using as an operating parameter, notably, the item of data relating to the radius of curvature;

the first set of information, the second set of information and the third set of information comprise, notably, an item of data relating to the radius of curvature of the bend in question, the system being connected to a speed limiting system in order to limit the speed of the vehicle to a limit value depending, notably, on the radius of curvature of the bend in question.

Finally, the present invention relates to any motor vehicle equipped with the system for the anticipated detection of a bend on a portion of road according to the invention, with its main characteristics and optionally one or more complementary characteristics.

The geographical positioning system may be, for example, a system comprising a network of satellites allowing the geodesic positioning of receivers with which they communicate such as, for example, the GPS network. In the case of a GPS network, the data receiver is a GPS receiver or aerial.

These and other objects and advantages of the invention will be apparent from the following description, the accompanying drawings and the appended claims.

BRIEF DESCRIPTION OF THE ACCOMPANY DRAWINGS

The invention and its various applications will be better understood on reading the following description and on examining the accompanying drawings.

The drawings are presented merely by way of example and do not in any way restrict the invention. In the drawings.

DETAILED DESCRIPTION OF THE PREFERRED EMBODIMENTS

Figure 1:
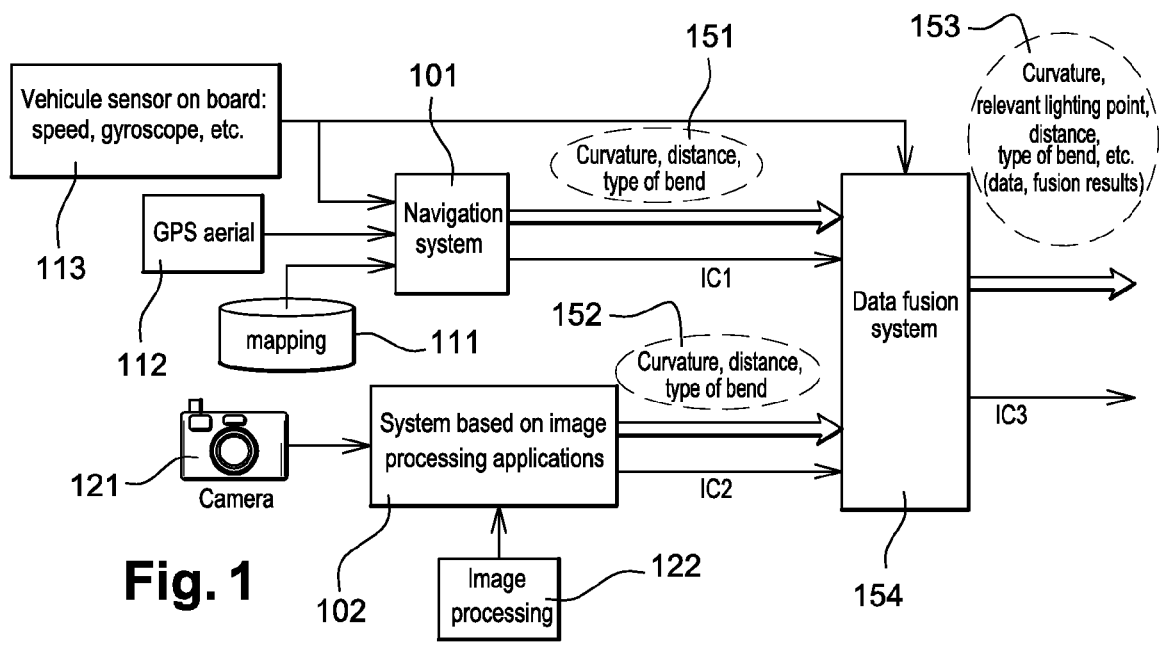
FIG. 1 is a representation of the principle of the invention, illustrating the combination of the on-board systems in the vehicle.

Unless otherwise indicated, the various elements appearing in several drawings shall be denoted by the same reference numeral.

FIG. 1 shows schematically the various elements found in an embodiment of the method according to the invention within a motor vehicle 200 providing a final set of information 153 relating to a bend 201 which a vehicle 200 is about to approach. Basically, the vehicle 200 in question contains a first system 101 for the anticipated detection of a bend 201, called the navigation system, utilizing, notably, mapping data 111 and a GPS aerial 112 which is placed on the vehicle 200 and is capable of receiving precise location information. In the example in question, the first system 101 also utilizes sensors 113 on board the vehicle 200 in question, of the speed sensor, gyroscope, steering wheel angle sensor type, etc. These various sensors 113 are capable of issuing various types of information for checking that the route actually taken by the vehicle 200 corresponds to the route planned by the first system 101. The first system 101 provides a first set of information 151 on the subsequent bend 201 which the vehicle 200 will take. Notably, the first set of information 151 comprises data on the radius of curvature, the distance between the bend 201 and the current position of the vehicle 200, the type of bend—bend to the left or bend to the right, etc.

The vehicle 200 also contains a second system 102 for the anticipated detection of bends 201, called the image processing system, utilizing, notably, a camera 121 capturing images of the road which the vehicle 200 is about to take and a set of image processing applications 122, the algorithms of which allow, for example by detection of the white lines or by analysis of the curbs of the road, the production of a second set of information 152 on the subsequent bend 201 which the vehicle 200 will take. Notably, the second set of information 152 comprises data on the radius of curvature, the distance between the bend 201 and the current position of the vehicle 200, this type of bend (to the left, to the right), etc.

According to the invention, the final set of information 153 is developed from the first set of information 151 and the second set of information 152. For this purpose, use is made of data processing means with, notably, a microprocessor and specific software applications, in a data fusion system 154. In a first, basic example, the final set of information 153 comprises, for each item of data present in the first set of information 151 and in the second set of information 152, an item of data adopting as its value the average of the values of the two corresponding items of data in the first set of information 151 and the second set of information 152. New information, of the type describing the position of a relevant lighting point 202, is obtained from the final data obtained in the final set of information 153 and by taking account of the information coming from the on-board sensors 113.

Another, more sophisticated embodiment proposes to associate the first set of information 151 and the second set of information 152 with a first confidence index IC1 and with a second confidence index IC2, respectively, in order to merge the (camera-based and navigation-based) first and second systems 101 and 102. These confidence indices IC1 and IC2 are calculated from a plurality of criteria, denoted by Ci, also referred to as parameters. In order to merge the first and second systems 101 and 102, a modelling and knowledge assessment phase allows the confidence indices IC1 and IC2 of the first and second systems 101 and 102 to be calculated on the basis of the various defined criteria. Thus, in an example for calculating the first confidence index IC1, the following equation is adopted:

$$IC1=(\alpha_1 \times C_1 + \alpha_2 \times C_2 + \alpha_3 \times C_3 + \alpha_4 \times C_4 + \alpha_5 \times C_5 + \alpha_6 \times C_6)/(\alpha_1 + \alpha_2 + \alpha_3 + \alpha_4 + \alpha_5 + \alpha_6), \text{ wherein:}$$

$C_1$: type of road;
$C_2$: level of information on the road (provided by the ADAS classification);
$C_3$: functional class of the road: FC1 or FC2;
$C_4$: environment (town, motorway exit, intersection, etc.);
$C_5$: confidence index of the GPS positioning;
$C_6$: guide mode selected or not selected by the driver;

and wherein $\alpha_1$, $\alpha_2$, $\alpha_3$, $\alpha_4$, $\alpha_5$, $\alpha_6$ are weighting coefficients, referred to as intermediate confidence indices, assigned to the various criteria as a function of the reliability of their information. These weights are generally defined by experience or by learning.

| Criteria | Value | Intermediate confidence index |
|---|---|---|
| Criterion 1: type of road | Type of road = European | 0.9 |
| | Type of road = motorway | 0.9 |
| | Type of road = main | 0.8 |
| | Type of road = secondary | 0.7 |
| | Type of road = minor | 0.5 |
| Criterion 2: level of information on the road: ADAS attribute | Validated | 0.9 |
| | Not validated | 0.5 |
| Criterion 3: functional class of the road: FC1 or FC2 | Validated | 0.9 |
| | Not validated | 0.5 |
| Criterion 4: environment | Town | 0.7 |
| | Intersection | 0.5 |
| | Motorway exit | 0.5 |
| Criterion 5: confidence index of the (GPS) positioning | | Value provided by the navigation system |
| Criterion 6: guide mode selected or not selected by the driver | Selected | 0.9 |
| | Not selected | 0.5 |

The foregoing table provides an example of allocation of values to these intermediate confidence indices. These values are given merely by way of non-limiting examples.

In other examples for determining the first confidence index IC1, other parameters may be taken into account, notably the accuracy of the digitization of the mapping, the date on which this mapping was updated, etc.

An example for calculating the second confidence index IC2 may correspond, for a captured image, to the following equation:

$$IC2=(\alpha_e \times C_e + \alpha_o \times C_o + \alpha_g \times C_g + \alpha_s \times C_s)/(\alpha_e + \alpha_o + \alpha_g + \alpha_s),$$
wherein the various criteria used have the following attributions:

$C_e$: entropy (measurement of the texture of the image in question);
$C_o$: shadow factor on the image in question;
$C_g$: vertical gradient of the decrease in light on the image in question;
$C_s$: index of symmetry of the image in question;

and wherein $\alpha_e$, $\alpha_o$, $\alpha_g$, $\alpha_s$ are weighting coefficients assigned to the various intermediate indices as a function of the reliability of the information and the relevance of the associated criteria. These weighting coefficients are, for example, defined by conducting a statistical study of the criteria by learning.

Once the first confidence index IC1 and the second confidence index IC2 have been determined, the final set of information 153 may, in this embodiment, be determined by making a fusion of the first and second sets of information 151 and 152 and by taking into account the respective confidence index thereof. Various possibilities are conceivable for carrying out the fusion.

A first possibility consists, for obtaining a value of an item of data from the final set of information 153, in taking directly a weighted average, for each data type of the first and the second set of information 151 and 152, by weighting the value of the item of data in question by the confidence index of the corresponding set of information.

More generally, the weighting coefficients are restricted to adhering to the order established between the confidence indices: if the first confidence index IC1 is respectively greater or lesser than the second confidence index IC2, then the weighting coefficients allocating the data of the first set of information 151 will respectively be greater or lesser than the weighting coefficients allocating the data of the second set of information 152, without the weighting coefficients thereby adopting as their value the values of the confidence indices. In such a case, the values of the weighting coefficients can integrate various criteria and, notably, favor one of the two on-board systems for the anticipated detection of bends that has proven more reliable over the course of time.

In another embodiment, each confidence index IC1 and IC2 is compared to a threshold value. In an example of this type, if one of the confidence indices is less than the threshold value to which it is compared, then the set of information allocated to the confidence index in question is not taken into account for establishing the final set of information. A fail-safe mode based on a single anticipated detection system is thus adopted; nevertheless, the fail-safe mode remains anticipatory. If the two confidence indices are less than the threshold value to which they are compared, a fail-safe mode based, for example, on the steering wheel angle sensor is adopted. A fail-safe mode of this type, use of which is highly unlikely, is therefore no longer anticipatory; the detection is therefore said to be instantaneous.

Generally speaking, the determination of the confidence indices and the occurrence thereof in the fusion of the knowledge derived from the two systems depend on the fusion strategy used. The fusion strategy may follow various models of the Bayesian theory, fuzzy logic set theory or else Dempster-Shafer theory of evidence type. A third confidence index IC3 is associated with the final set of information 153. It allows a reliability level of the final information to be presented. It is therefore used freely in accordance with the embodiments: for example, if the third confidence index IC3 is less than a threshold value, provision is made to choose the use of a fail-safe mode of operation not using the data of the final set of information 153. In one embodiment, the third confidence index IC3 is equal to the average of the first confidence index IC1 and the second confidence index IC2.

Figure 2:
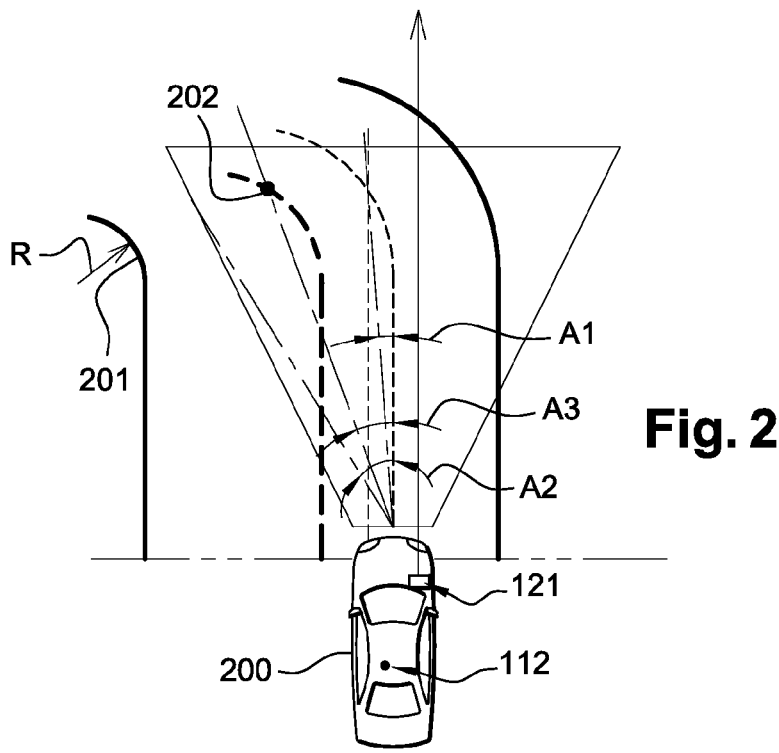
FIG. 2 is a schematic representation of a first application of the method according to the invention.

FIG. 2 shows a first example of application of the method according to the invention. In this example, the final set of information 153 is utilized to determine, before a bend 201 has even been entered, a relevant lighting point 202 in the bend 201 and the movement of this relevant lighting point 202 between entering the bend 201 and leaving the bend 201. For this purpose, use is basically made of the item of data of a radius of curvature R present in the final set of information 153 and also of the vehicle speed.

The first system 101 alone would have instructed, based on the radius of curvature data which it calculates, rotation of the headlights through a first angle A1. The second system 102 alone would have instructed, based on the radius of curvature data which it calculates, rotation of the headlights through a second angle A2. The radius of curvature data after the fusion of the information from the first and second systems 101 and 102 is used to orient in an anticipatory matter the headlights in the bends through an angle A3 which may assume a value close to A1, close to A2 or a value between the angles A1 and A2. This orientation of the headlights, which results in rotation or in successive illumination of the light sources, also takes account of the current state of the vehicle 200 (speed, acceleration, course, etc.) from information from the sensors 113 on board the vehicle 200. This information is taken into account in calculating the rotation in order to adhere to the relevant distance (relative to the relevant lighting point 202) which depends on the vehicle speed.

Another possible application of the method according to the invention is the use thereof as a dynamic curve warning system. By detecting the bend 201, and from the radius of curvature data obtained following the fusion of the information from the first and second systems 101 and 102, the maximum speed at which the bend 201 may be taken without the risk of over- or under-steering is calculated. In order to arrive at the bend 201 at a speed not exceeding this maximum value, the vehicle speed is checked well before the vehicle 200 arrives at the bend 201 and the driver is alerted by the emission of a warning, for example a sound warning, advising him of the appropriate speed for the bend 201. The minimum warning distance d between the vehicle 200 and entering the bend 201 may be given by the following equation:

$$d = \frac{(v - v_{rec})^2}{2\gamma} + \tau v,$$

wherein
  $v$ is the vehicle speed;
  $v_{rec}$ is the recommended speed calculated from the radius of curvature data in the final set of information;
  $\gamma$ is the deceleration (for example, 2 m.s−2)
  $\tau$ is the driver's reaction time (for example, 1.2 seconds).

Figure 3:
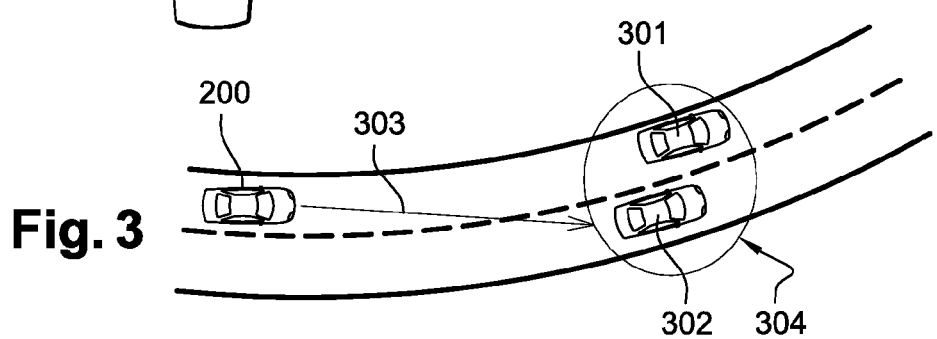
FIG. 3 is a schematic representation of a second application of the method according to the invention.

Another possible application, illustrated in FIG. 3, is the use of the information provided by the method according to the invention for optimizing the adaptive cruise control system (ACC) present in specific vehicles. The ACC is a driver aid system allowing drivers to drive in a more relaxed manner. Its objective is to automatically adapt the speed of the vehicle 200 to that of a vehicle 301 ahead and thus to relieve pressure on the driver. The vehicle ahead 301 is captured and recorded between about 0 and 120 meters. For this purpose, a radar or an infrared beam 303, on board the vehicle 200 examines the space in front of the vehicle 200 and communicates, if appropriate, the distance of the vehicle ahead 301 and also the speed thereof.

However, as illustrated in FIG. 3, false vehicle detections 304 can occur. The term "false detection" refers in the present context to the detection of a vehicle 302 ahead, or of an element of the infrastructure itself if there is no third-party vehicle, which is located in front of the vehicle 200 containing the ACC system but is not located in the path of the vehicle 200. Such a scenario is common in bends.

As a result, the vehicle speed is reduced by taking account of the distance from this vehicle 302 or from the detected element of the infrastructure. The vehicle 302 which has to be detected is that which is in the same lane. Using the information anticipating the existence of a bend 201 and also the value of the radius of curvature (or bend radius) thereof allows the ACC to be optimized in order to detect the right vehicle 301 or 302.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method for the anticipated detection of a bend on a portion of road taken by a motor vehicle, comprises the following steps:
    establishing a first set of information on the bend in the portion of the road in question utilizing a navigation system, said first set of information being associated with a first confidence index, said navigation system comprising a receiver for receiving data from a geographical positioning system and mapping data;
    establishing a second set of information on the bend in question utilizing an image processing system, said second set of information being associated with a second confidence index, said image processing system comprising a camera and an image processing application that captures an image on the bend; and
    establishing a third set of information on the bend in question using a data fusion system questioning the portion of the road in response to the first set of information and the second set of information, each of said first and second sets of information comprising data on at least one of a radius of curvature of the bend in the portion of the road or the distance between the bend and the vehicle;

using said third set of information to determine before the bend has been entered, a relevant light point in the bend, and the movement of said relevant light point between entering the bend and leaving the bend and moving the headlights through an angle in response thereto.

2. The method according to claim 1, wherein said third set of information is associated with a third confidence index developed from said first confidence index and said second confidence index.

3. The method according to claim 2, wherein said first confidence index is developed from at least two parameters of a first set of parameters comprising the following parameters:
   accuracy of the GPS positioning;
   accuracy of the digitization of the mapping;
   date on which the mapping was updated;
   type of road;
   level of information on the road;
   functional class of the road;
   environment of the vehicle;
   selection of a guide mode by the driver and level of conformity between a planned route and information provided by sensors on board the vehicle.

4. The method according to claim 3, wherein said first confidence index is developed by taking a weighted average of values allocated to the following parameters, said parameters being associated with weighting coefficients resulting from a learning phase.

5. The method according to claim 2, wherein said second confidence index is developed from one or more parameters, of a second set of parameters relating to an image obtained by the camera, from among at least two of the following parameters:
   measurement of the texture of the image in question;
   shadow factor on the image in question;
   vertical gradient of the decrease in light;
   index of symmetry of the image in question.

6. The method according to claim 5, wherein said second confidence index is developed by taking a weighted average of values allocated to all of the parameters of said second set of parameters, said parameters being associated with weighting coefficients resulting from a learning phase.

7. The method according to claim 2, wherein it includes the additional steps comprising:

comparing the first confidence index to a first threshold value and the second confidence index to a second threshold value;

considering, when establishing the third set of information, only the set(s) of information, among the first set of information and the second set of information, of which the confidence index is greater than the threshold value to which it is compared.

8. The method according to claim 7, wherein it includes the additional step of adopting, in the event of said first confidence index and said second confidence index being less than the threshold values to which they are compared, a fail-safe mode of operation in which the bend in question is detected instantaneously.

9. The method according to claim 1, wherein said first set of information and said second set of information comprise at least one item of data from among the following: radius of curvature of the bend in question, distance between a momentary position of the vehicle and the entering of the bend in question, type of bend.

10. The method according to claim 1, wherein said third set of information comprises at least one item of data from among the following: radius of curvature of the bend in question, distance between a momentary position of the vehicle and the entering of the bend in question, type of bend, relevant lighting point.

11. The method according to claim 1, wherein said third set of information comprises data, the value of each of said items of data being established by taking a weighted average of corresponding data from said first set of information and said second set of information, an item of data of the first set being weighted by a first weighting coefficient and the corresponding data of said second set of information being weighted by a second weighting coefficient, said first weighting coefficient being greater than said second weighting coefficient if and only if said first confidence index is greater than said second confidence index.

12. The method according to claim 1, wherein said first set of information and said second set of information are processed jointly in a system for processing information by data fusion.

13. The method according to claim 1, wherein the image processing system carries out the operation consisting in detecting curbs of the portion of road in question.

14. The method according to claim 1, wherein said receiver for data from a geographical positioning system is a GPS aerial.

* * * * *